United States Patent [19]

Chundury

[11] Patent Number: 5,274,035
[45] Date of Patent: Dec. 28, 1993

[54] ETHYLENE VINYL ACETATE COMPOSITIONS AND TUBING MADE THEREFROM

[75] Inventor: Deenadayalu Chundury, Newburgh, Ind.

[73] Assignee: Ferro Corporation, Cleveland, Ohio

[21] Appl. No.: 815,723

[22] Filed: Dec. 30, 1991

[51] Int. Cl.$^5$ ............................................. C08L 53/00
[52] U.S. Cl. .................................... 525/92; 525/74; 525/78; 525/80; 525/194; 525/208; 525/221; 525/222; 428/36.8; 428/36.9; 428/36.92
[58] Field of Search ................ 525/89, 74, 92, 78, 525/93, 80, 94, 192, 194, 208, 221, 222, 330.3; 428/36.8, 36.9, 36.92

[56] References Cited

U.S. PATENT DOCUMENTS

| | | | |
|---|---|---|---|
| 3,865,776 | 2/1975 | Gerges | 268/33.6 |
| 3,941,859 | 3/1976 | Batiuk et al. | 525/211 |
| 4,243,576 | 1/1981 | Fischer et al. | 525/222 |
| 4,266,542 | 5/1981 | Becker et al. | 128/214 |
| 4,551,140 | 11/1985 | Shinohara | 604/262 |
| 4,613,640 | 9/1986 | Deisler et al. | 524/264 |
| 4,675,364 | 6/1987 | Churma et al. | 525/387 |
| 4,707,389 | 11/1987 | Ward | 428/36 |
| 4,810,542 | 3/1989 | Kawai et al. | 428/36.7 |
| 4,923,742 | 5/1990 | Killian et al. | 428/283 |
| 4,945,127 | 7/1990 | Kagawa et al. | 525/222 |
| 4,948,643 | 8/1990 | Mueller | 428/36.6 |

*Primary Examiner*—John Kight, III
*Assistant Examiner*—Rachel Johnson
*Attorney, Agent, or Firm*—Rankin, Hudak & Hill

[57] ABSTRACT

This invention relates to a tube prepared by the process comprising the steps of (1) blending polymer composition comprising (A) ethylene vinyl acetate copolymer and greater than 0.020% by weight of a cross-linking agent; or (B) a mixture of (a) a major amount of an ethylene vinyl acetate copolymer, (b) a minor amount of one or more polymers selected from (i) an propylene ethylene copolymer, (ii) at least one selectively hydrogenated block copolymer of a vinyl aromatic hydrocarbon and a conjugated diene, (iii) at least one selectively hydrogenated block copolymer of a vinyl aromatic hydrocarbon and a conjugated diene to which has been grafted with an alpha,beta-olefinically unsaturated monocarboxylic or dicarboxylic acid reagent, (iv) at least one terpolymer of an alpha-olefin, at least one acrylic ester, and an alpha,beta-olefinically unsaturated dicarboxylic acid reagent, or a glycidyl acrylate, (v) at least copolymer of an alpha-olefin and at least one acrylic ester, (vi) at least one vinyl aromatic hydrocarbon; and (vii) at least one polyetheramide block copolymer, and optionally, (c) a cross-linking agent provided that when (b) is (i), then the mixture includes the cross linking agent (c); and (2) extruding the polymer composition into the tube. The present invention also relates to polymer compositions for making the tubing. The tubes, especially medical tubes, of the present invention have improved kink resistance, coilability, clarity, flexibility and stability under sterilization conditions.

30 Claims, No Drawings

ETHYLENE VINYL ACETATE COMPOSITIONS AND TUBING MADE THEREFROM

TECHNICAL FIELD

This invention relates to tubing and polymer compositions of ethylene vinyl acetate.

BACKGROUND

Thermoplastics have been widely used in the formation of medical parts for which excellent design, performance, and volume capabilities are required. In order to be useful in medical applications, a thermoplastic must meet various criteria. The plastics must be inexpensive and easy to manufacture. The plastic should not react with or leach additives into physiologic solutions. The plastics must have resistance to degradation and/or deformation from steam, irradiation and ethylene oxide sterilization techniques. For use in medical tubing, plastics must have beneficial kink-resistance, coilability, contact clarity, flexibility and bondability.

One resin that has been used successfully in medical environments is poly(vinyl chloride) ("PVC"). The relevant art prior to and the subsequent development of this material as a medical plastic is reviewed in R. N. Burgess, ed., *Manufacture and Processing of PVC*, Macmillan Publishing Co., Inc., New York, 1982.

PVC, however, is subject to certain drawbacks and disadvantages. Most notably, PVC requires a considerable proportion of plasticizers in order to make the flexible material. Further, PVC contains a high level of halogen atoms (i.e., about 57% by weight halogen atoms). The halogen atoms pose problems for disposal of used PVC medical tubing.

With recent environmental movements to control the amount of halogen atoms in plastics, it is desirable to have medical tubing having trace or no halogen atoms. Disposal of most medical waste is usually accomplished by incineration. A halogen-free medical tubing would have no halogen atoms to pose environmental problems.

U.S. Pat. No. 3,865,776 issued to Gergen relates to kink-resistant polymeric tubing. The tubing is prepared by a combination of block copolymers, mineral white oil, polypropylene, and a resin.

U.S. Pat. No. 4,266,542 issued to Becker et al relates to ethylene vinyl acetate formulations having improved properties. The compositions consist essentially of a major portion of ethylene-vinyl acetate copolymer which contains 22% to 30% by weight of vinyl acetate units and having a melt flow index of 0.5 to 10 and a minor portion of a second ethylene-vinyl acetate copolymer having 25 to 40% by weight vinyl acetate units and having a melt flow index of 20 to 1000.

U.S. Pat. No. 4,675,364 issued to Churma et al relates to modification of ethylene vinyl acetate copolymer. The melt index of ethylene-vinyl acetate copolymers is reduced and the rheology is modified by the addition of a cross-linking agent to the copolymer. Churma et al teach that in the process, there is essentially no detectable cross-linking in the copolymer and the major affect of the reaction of the cross-linking agent with a copolymer is the reduction of the melt index and modification of rheology of the molten copolymer as it is extruded.

SUMMARY OF THE INVENTION

This invention relates to a tube prepared by the process comprising the steps of (1) blending polymer composition comprising (A) ethylene vinyl acetate copolymer and greater than 0.020% by weight of a cross-linking agent; or (B) a mixture of (a) a major amount of an ethylene vinyl acetate copolymer, (b) a minor amount of one or more polymers selected from (i) an propylene ethylene copolymer, (ii) at least one selectively hydrogenated block copolymer of a vinyl aromatic hydrocarbon and a conjugated diene; (iii) at least one selectively hydrogenated block copolymer of a vinyl aromatic hydrocarbon and a conjugated diene to which has been grafted with an alpha,beta-olefinically unsaturated monocarboxylic or dicarboxylic acid reagent; (iv) at least one terpolymer of an alpha-olefin, at least one acrylic ester, and an alpha,beta-olefinically unsaturated dicarboxylic acid reagent, or a glycidyl acrylate; (v) at least copolymer of an alpha-olefin and at least one acrylic ester, (vi) at least one vinyl aromatic hydrocarbon; (vii) at least one polyetheramide block polymer, and optionally, (c) a cross-linking agent provided that when (b) is (i), then the mixture includes the cross linking agent (c); and (2) extruding the polymer composition into the tube.

The present invention also relates to polymer compositions for making the tubing. The tubes, especially medical tubes, of the present invention have one one or more improved properties, such as kink-resistance, coilability, contact clarity, flexibility, tear-resistance, stability under sterilization conditions and bondability heat, high frequency welding or solvent bonding techniques.

DETAILED DESCRIPTION

The tubes and compositions of the present invention are prepared from a major amount or solely from ethylene vinyl acetate copolymers. The ethylene vinyl acetate may be mixed with one or more components as described in more detail herein.

Ethylene-Vinyl Acetate Copolymer

The ethylene-vinyl acetate (EVA) copolymer may be any ethylene-vinyl acetate copolymer useful in preparing tubing as described herein. The copolymers may be prepared by any known means such as free radical polymerization. Many ethylene-vinyl acetate copolymers are available commercially. The EVA generally contained at least about 5% by weight of vinyl acetate, generally, from about 5% to about 50% by weight of vinyl acetate. In one embodiment, ethylene-vinyl acetate copolymers have vinyl acetate contents from about 10%, or about 15%, or about 25% up to about 40%, or about 20% by weight.

In general, the ethylene vinyl acetate copolymers have a melt flow range from about 0.1 to about 150 g/10 min., preferably about 0.1 to about 10 g/10 min., more preferably about 0.1 to about 2 g/10 min.

The preparation of the EVA copolymers may be carried out according to known methods. A typical method of preparing EVA copolymers is found in U.S. Pat. No. 3,506,630 which is incorporated herein by reference. Another method of preparing EVA copolymers is described in U.S. Pat. No. 3,325,460 which is also incorporated by reference. The ethylene-vinyl acetate copolymers used in the present invention are generally present in a major amount (i.e., greater than 50% by weight of the composition). The ethylene-vinyl acetate copolymer may be present in an amount greater than 55%, or 60% by weight of the polymer composition. In the polymer compositions, the exact amount of ethylene vinyl acetate copolymer is dependent on the amount of additional polymers (discussed below) included in the polymer mixture. In these embodiments, it is understood that the ethylene vinyl acetate copolymers comprises the balance of the polymer composition. The ethylene-vinyl acetate copolymers used in the present invention are available commercially and are known to those skilled in the art. Examples of commercially available ethylene-vinyl acetate copolymers include Elvax 265, 3120, and 3165 available commercially from DuPont Chemical Company and USI 643 and 631 available commercially from Quantum Chemical Company.

The polymer compositions of the present invention may also include a mixture of ethylene-vinyl acetate with one or more of the following polymers: (i) an propylene ethylene copolymer; (ii) a vinyl aromatic hydrocarbon; (iii) at least one selectively hydrogenated block copolymer of a vinyl aromatic hydrocarbon and conjugated diene; (iv) at least one selectively hydrogenated block copolymer of a vinyl aromatic hydrocarbon and a conjugated diene to which has been grafted with an alpha, beta-olefinically unsaturated monocarboxylic or dicarboxylic acid reagent; (v) at least one terpolymer of an alpha-olefin, at least one acrylic ester, and an alpha, beta-olefinically unsaturated dicarboxylic acid reagent, or a glycidyl acrylate; (vi) at least one copolymer of an alpha-olefin and an acrylic ester; and (vii) at least one polyetheramide block copolymer. The polymers may be used individually or in combination. Further, the polymers may be used in combination with cross-linking agents as described below.

(i) Propylene Ethylene Copolymer

One of the polymers of the polymer compositions of the present invention is at least one copolymer of propylene and ethylene. The propylene ethylene copolymer will generally contain from about 1%, or about 4% to about 10%, or about 7% by weight of ethylene. In one embodiment, the ethylene content is about 6% by weight. In one embodiment, the propylene ethylene copolymer is a random copolymer.

Processes useful in preparing the propylene ethylene copolymers useful in preparing the present invention are well-known to those skilled in the art and many such copolymers are available commercially. Such random copolymers may be prepared by any of a number of methods known in the art including those set forth in the *Encyclopedia of Polymer Science & Engineering*, Volume 13, 2nd edition, Wiley & Sons, pp. 500-et seq. (and footnotes cited therein), which is fully incorporated by reference herein. Propylene ethylene copolymers useful in the present invention are available commercially. Examples of these copolymers include Fina Y-8573 and Z-7650 available from Fina Oil and Chemical Company, Dallas, Tex., U.S.A and Soltex 4208 available from Soltex Polymer Corporation, Houston, Tex., U.S.A.

The propylene ethylene copolymers are used in the present invention in an amount from about 20%, or about 25%, or about 30% up to about 50%, or about 40% by weight of the polymer composition.

(ii) At Least One Selectively Hydrogenated Block Co-Polymer of a Vinyl Aromatic Compound and a Conjugated Diene One of the polymers of the polymer composition is (ii) at least one selectively hydrogenated block copolymer of a vinyl aromatic hydrocarbon and a conjugated diene.

The block copolymers of vinyl aromatic hydrocarbons and conjugated dienes which may be utilized in the polymer blends of the present invention include any of those which exhibit elastomeric properties and those which have 1,2-microstructure contents prior to hydrogenation of from about 7% to about 100%. The block copolymers may be diblock, triblock, multiblock, starblock, polyblock or graftblock copolymers. Throughout this specification and claims, the terms diblock, triblock, multiblock, polyblock, and graft or graftedblock with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in *Block Copolymers, Science Technology*, Dale J. Meier, Ed., Harwood Academic Publishers, 1979, at pages 1-5.

Such block copolymers may contain various ratios of conjugated dienes to vinyl aromatic hydrocarbons including those containing up to about 60% by weight of vinyl aromatic hydrocarbon. Accordingly, multi-block copolymers may be utilized which are linear or radial symmetric or asymmetric and which have structures represented by the formulae A-13 B, A—B—A, A—B—A—B, B—A—B, $(AB)_{0,1,2}$... BA, etc., wherein A is a polymer block of a vinyl aromatic hydrocarbon or a conjugated diene/vinyl aromatic hydrocarbon tapered copolymer block, and B is a polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

The vinyl aromatic compounds include styrene and the various substituted styrenes which is represented by the following formula

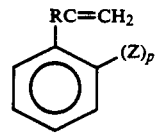

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyltoluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion is from about 10 to about 80%, and the vinyl content is preferably from about 25 to about 65%, particularly 35 to 55% when it is desired that the modified block copolymer exhibit rubbery elasticity. The vinyl content of the block copolymer can be measured by means of nuclear magnetic residence.

Specific examples of diblock copolymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, and alpha-methylstyrene-isoprene-alpha-methylstyrene.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5 to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are the hydrogenated block copolymers of styrene-isoprene-styrene such as an (ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP). One example of a commercially available selectively hydrogenated is Kraton G-1652 which is a hydrogenated SBS triblock comprising 30% styrene end blocks and a midblock equivalent is a copolymer of ethylene and 1-butene (EB). This hydrogenated block copolymer is often referred to as SEBS.

In another embodiment, the selectively hydrogenated block copolymer is of the formula $$B_n(AB)_oA_p$$

wherein n=0 or 1;

o is 1 to 100;

p is 0 or 1;

each B prior to hydrogenation is predominantly a polymerized conjugated diene hydrocarbon block having a number average molecular weight of about 20,000 to about 450,000;

each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

(iii) Hydrogenated Block Copolymer of a Vinyl Aromatic Hydrocarbon and a Conjugated Diene Grafted With an Alpha Olefinically Unsaturated Carboxylic Acid Reagent The polymer compositions may also contain (iii) a product which is obtained by grafting an alpha,beta-olefinically unsaturated monocarboxylic or dicarboxylic acid reagent onto the selectively hydrogenated block copolymers described above as polymer (ii).

The block copolymers of the conjugated diene and the vinyl aromatic compound are grafted with an alpha,beta-olefinically unsaturated monocarboxylic or dicarboxylic acid reagent. The carboxylic acid reagents include carboxylic acids per se and their functional derivatives such as anhydrides, imides, metal salts, esters, etc., which are capable of being grafted onto the selectively hydrogenated block copolymer. The grafted polymer will usually contain from about 0.2 to about 20%, and preferably from about 0.1 to about 10% by weight based on the total weight of the block copolymer and the carboxylic acid reagent of the grafted carboxylic acid.

The monobasic alpha,beta-olefinically unsaturated carboxylic acid reagents are carboxylic acids corresponding to the formula $$RCH=C(R_1)COOH$$

wherein R is hydrogen or a saturated aliphatic or alicyclic, aryl, alkaryl or heterocyclic group. Preferably, R is hydrogen or an alkyl group containing from 1 to about 10 carbon atoms. $R_1$ is hydrogen or an alkyl group containing from 1 to about 10 carbon atoms. The total number of carbon atoms in R and $R_1$ should not exceed 18 carbon atoms. Specific examples of useful monobasic carboxylic acids include acrylic acid, methacrylic acid, cynamic acid, crotonic acid, acrylic anhydride, sodium acrylate, calcium acrylate and magnesium acrylate, etc. Examples of dicarboxylic acids and useful derivatives thereof include maleic acid, maleic anhydride, fumaric acid, mesaconic acid, itaconic acid, citraconic acid, itaconic anhydride, citraconic anhydride, monomethyl maleate, monosodium maleate, etc.

In order to promote the grafting of the carboxylic acid reagent to the hydrogenated block copolymer, free radical initiators are utilized, and these initiators usually are either peroxides of various organic compounds. The amount of initiator utilized generally from about 0.01% to about 5% by weight based on the combined weight of the combined copolymer and the carboxylic reagent. The amount of carboxylic acid reagent grafted onto the block copolymers can be measured by determining the total acid number of the product. The grafting reaction can be carried out by melt or solution mixing of the block copolymer and the carboxylic acid reagent in the presence of the free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X from Shell, often referred to as a maleated selectively hydrogenated SEBS copolymer.

(iv) Terpolymer of Alpha-Olefin, Acrylic Ester, and Either an Olefinically Unsaturated Dicarboxylic Acid Reagent or a Glycidyl Acrylate The polymer compositions of the present invention may include (iv) a terpolymer of an olefin, acrylic ester and either a dicarboxylic acid or a glycidyl acrylate. In one embodiment, the terpolymer will comprise from about 60% to about 94% by weight of the olefin, from about 5% to about 40% by weight of the acrylic ester, and from about 1% to about 10% of the dicarboxylic acid or glycidyl acrylate.

The olefins used in the preparation of the terpolymers (iv) are alpha-olefins. These alpha-olefins or 1-olefins may contain from 2 to about 20 or to about 6 carbon atoms. Alpha-olefins include ethylene, propylene, 1-butene, 1-pentene, 4-methyl-1-pentene, 1-octene, 1-decene, 4-ethyl-1-hexene, etc, or mixtures of two or more of these olefins. In one preferred embodiment, the alpha-olefins contain from 2 to about 6 carbon atoms, and more preferably, the alpha-olefin is ethylene, propylene or a mixture of ethylene and propylene.

The acrylic esters used in the formation of the terpolymer (iv) are characterized by the formula $$CH_2=C(R)COOR'$$

wherein R is hydrogen, or an alkyl group containing 1 to 4 carbon atoms such as a methyl or ethyl group, and R' is an alkyl group containing from 1 to about 6 carbon atoms. Specific examples of esters characterized by the above formula which are useful in forming the terpolymers (iv) include methyl acrylate, ethyl acrylate, butyl acrylate, methyl methacrylate, ethyl methacrylate, ethyl ethacrylate, etc.

The third component utilized in the preparation of the terpolymers (iv) may be at least one alpha,beta-olefinically unsaturated dicarboxylic acid reagent. The dicarboxylic acid reagents include the dicarboxylic acids, anhydrides, partial esters, imides, metal salts, etc., and any of the carboxylic acid reagents described as being useful in the preparation of the block copolymers (iv). In one embodiment, the preferred dicarboxylic acid reagent is maleic anhydride.

The third monomer used in the preparation of terpolymer (iv) may be a glycidyl acrylate such as represented by the formula

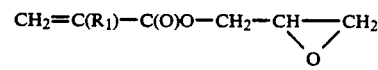

wherein $R_1$ is hydrogen or a lower alkyl group of 1 to 6 carbon atoms. Preferably $R_1$ is hydrogen or a methyl or ethyl group.

Specific examples of monomer mixtures which can be utilized to form terpolymers useful as compatiblizers in the present invention include ethylene-methyl acrylatemaleic anhydride; ethylene-ethyl acrylate-maleic anhydride; ethylene-butyl acrylate-maleic anhydride; propylene-methyl acrylate-maleic anhydride; propylene-ethyl acrylate-maleic anhydride; ethylene-methyl acrylate-glycidyl methacrylate; ethylene-methyl acrylate-glycidyl acrylate; etc.

The terpolymers which are useful as one of the compatiblizers in the polymer composition of the present invention can be prepared by known techniques, and some are available commercially. For example, CdF Chimie offers a number of such terpolymers under the general trade designation Lotader TM. Specific examples include Lotader TM 3200 (formerly LX4110) prepared from a mixture comprising about 88% by weight of ethylene, 9% by weight of butyl acrylate and 3% of maleic anhydride. This terpolymer has a melt index of 5 and an acid index is determined by titration of 19 mg KOH/g, a melting point of 107° C. Lotader ™ 6600 comprises about 70% of ethylene, 27% of an acrylic ester and about 3% maleic anhydride. This terpolymer has an acid index of 17 mg KOH/g. Lotader ™ 4700 which comprises about 62.5% ethylene, 32% of an acrylic ester and about 1.5% of maleic anhydride has a melt index of about 40, a melting point of 70° C. and an acid index of 17 mg KOH/g. Lotader ™ AH8660 is a terpolymer of ethylene, an acrylic ester, and glycidyl methacrylate with a melting point of 79° C. and a vicat softening point (ASTM D1525, 1 KG) of 34° C. Additional examples of terpolymers include terpolymers comprising: 77% ethylene/20% ethyl acrylate/3% maleic anhydride; 89.5% ethylene, 7% ethyl acrylate and 3.5% maleic anhydride; and 70% ethylene/28.5% ethyl acrylate/and 1.5% maleic anhydride.

(v) Copolymer of an Alpha-Olefin and Acrylic Ester

The polymer composition of the present invention may include (v) a copolymer of an alpha-olefin and an acrylic ester. The olefin and acrylic ester are described above (see terpolymer (iv)). In one embodiment, the alpha-olefins contain from 2 to about 6 carbon atoms and more preferably, the alpha-olefin is ethylene, propylene or a mixture of ethylene and propylene. Specific examples of esters characterized by the above formula which are useful include methyl acrylate, ethyl acrylate, butyl acrylate, methyl methacrylate, ethyl methacrylate, ethyl ethacrylate, etc. A preferred ester is methyl acrylate.

The copolymer (v) may comprise from about 40 to about 95% by weight of the alpha-olefin and from about 5 to about 60% by weight of the carboxylic acid ester. In another embodiment the copolymers (v) contain from about 15 to 25% by weight of the carboxylic ester and about 75 to about 85% of ethylene. The copolymers can be prepared by procedures well known to those skilled in the polymer art, and such elastomers are available commercially. Examples of specific elastomers (v) include ethylene methyl acrylate copolymers (EMAC) such as those commercially available from Chevron under the designations SP2205, SP2255 and SP2260 having methyl acrylate contents of 20%, 18% and 24% by weight, respectively; from Exxon under the general trade designations "Escor" and available in commercial grades designated, e.g., TC110 and TC112 containing 20% and 18% methyl acrylate, respectively. Developmental Escor grade copolymers are also available from Exxon containing from 6% by weight of methyl acrylate (XS 11.04) to 28% by weight of methyl acrylate (XS 21.04 and 55.48). Lotryl 3610 is an ethylene-methyl acrylate copolymer having a methyl acrylate content of 29% by weight and is available from Atochem, Inc. Some developmental EMAC are also available from Chevron under trade designations such as TD1956, TS1967, TD1972 and another TD1972, and these contain 6%, 35%, 42% by weight of methyl acrylate, respectively.

Also useful as copolymer (v) are ethylene ethyl acrylates (EEA) such as those available from Union Carbide under the Bakelite designations DPD-6182, DPD-6169 and DPDA 9169. EBAs (ethylene butyl acrylates) are available from Atochem, Inc. under designations such as 17BG04 (15-18% ester content) and 30BA02 (28-32% ester content).

(vi) Polymers of Vinyl Aromatic Compounds

The blended polymer compositions of the present invention (ii) at least one polymer of a vinyl aromatic compound. The polymers may be homopolymers, copolymers, terpolymers or graft polymers. The copolymers include polymers of the vinyl aromatic compound and one or more copolymerizable monomers such as unsaturated dicarboxylic acid reagent including the acids, anhydrides, imides, metal salts and partial esters of said acids; acrylic acids and esters; alkyl-substituted acrylic acids and esters; acrylonitriles; dienes such as butadiene; etc. The terpolymers include polymers of the vinyl aromatic compound with two or more monomers including dienes, acrylonitrile, acrylic acids and esters, etc. Preferably the polymer composition of the invention comprise from about 0.5%, or about 1%, or about 5% to about 35%, or to about 25% by weight of the polymer (ii). In one embodiment, the polymer (ii) is present in an amount from about 0.5%, or about 1% to about 15%, or to about 10% by weight of the polymer compositions. In another embodiment, the polymer (ii) is present in an amount from about 15%, or about 20% to about 30%, or to about 25% by weight of the polymer composition.

Specific examples of homopolymers of vinyl aromatic compounds include polystyrene, poly(alpha-methylstyrene), poly(p-methylstyrene) and high impact polystyrene (HIPS).

The maleic anhydride and maleimide derivative compounds utilized in the formation of the copolymers with vinyl aromatic compounds may generally be represented by the formula

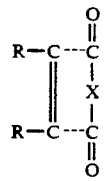

wherein each R group is hydrogen or an aliphatic or aromatic hydrocarbyl group or the two R groups are joined together to form a fused ring derivative, X is —O— or >NR$^2$ where R$_2$ is a hydrocarbyl group which may be an aliphatic or an aromatic hydrocarbyl group such as phenyl, methyl, ethyl, propyl, butyl, etc. Preferably both R groups are hydrogen.

Examples of maleic derivatives which are cyclic or bicyclic compounds include Diels-Alder reaction products of butadiene with maleic anhydride or a maleimide; Diels-Alder reaction products of cyclopentadiene with maleic anhydride or maleimide; and Diels-Alder reaction products of isoprene with maleic anhydride or an N-substituted maleimide. These cyclic or bicyclic derivatives have high glass transition temperatures.

Copolymers comprising a vinyl aromatic compound and metal salts of maleic acid also are useful in the blended polymer compositions of the present invention. The metals present in the metal salt of maleic acid may be Group I metals, Group II metals or transition metals. Alkali metals and transition metals are preferred. Partial esters of the unsaturated anhydrides also can be used. These can be obtained, for example, by reacting or esterifying, maleic acid or maleic anhydride with less than one equivalent of an alcohol such as methanol, ethanol, propanol, etc.

Examples of copolymerizable acrylic acids and esters include: methyl acrylate, ethyl acrylate, butyl acrylate, methyl methacrylate. Other vinyl monomers which can be used to form the copolymers and terpolymers include vinyl acetate, vinyl methyl ether, vinyl ethyl ether, vinyl chloride, isobutene, etc. The vinyl aromatic compounds also can be polymerized with dienes such as butadiene. SBR is a commercially available copolymer of styrene-butadiene.

The copolymers of the vinyl aromatic compounds with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic compound to a temperature at which the vinyl aromatic compound will polymerize, (2) stirring the polymerizing vinyl aromatic compound while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic compound is polymerizing. Procedures for preparing such copolymers are known in the art and have been described in, for example, U.S. Pat. No. 2,971,939.

In one embodiment, the styrene-maleic anhydride copolymers are preferred polymers in the blended polymer compositions of the present invention. The styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150, 250, 350 and 700 which are believed to be blends and/or grafts of SMA with SBR.

Other examples of impact modified styrenic and alphamethyl styrene copolymers with maleic anhydride and acrylonitrile include Arvyl 300 MR and 300 CR.

Low molecular weight styrene-maleic anhydride copolymers (Mw as low as 1500) also are useful and these are available commercially such as from Monsanto under the designation "Scripset" and from Atochem under the designation "SMA Resins". Sulfonated styrene-maleic anhydride copolymers (and their metal salts) also are available and useful in this invention. Two such products are available from Atochem:SSMA-1000 which is a sulfonated copolymer of about 50% styrene and 50% maleic anhydride; and SSMA 3000, a sulfonated SMA comprising about 75% styrene and 25% maleic anhydride.

Specific examples of copolymers of vinyl aromatic compounds include: styrene-acrylonitrile (SAN); styrene-acrylic acid; styrene methacrylic acid; styrene-butadiene; styrene-isoprene; and the hydrogenated versions of styrene-butadiene and styrene isoprene copolymers. The copolymers may be of the grafted or block types.

Terpolymers useful in this invention include: acrylonitrile-chlorinated polyethylene-styrene (ACS); acrylic-styrene-acrylonitrile (ASA); acrylonitrile-butadiene-styrene (ABS); EPDM; grafted SAN; and styrene-methyl methacrylate-maleic anhydride; etc. Graft polymers include ABS polymers such as Lustran (Monsanto), Cycolac (G.E.), Magnum (Dow), Zylar (polysar), and HIPS polymers available from many companies such as Amoco, Chevron, Dow, Mobil, Polysar, etc.

In one embodiment, the polymers comprise about 45% to about 83% (preferably about 50%, or about 60% to about 75%) by weight of the vinyl aromatic monomer, from about 15% to about 35% (preferably about 20–30%) by weight of an unsaturated dicarboxylic acid anhydride and from 2% to about 20% (preferably about 4–10%) by weight of a $C_{1-3}$ alkyl methacrylate ester. Terpolymers of this type are available commercially from Monsanto.

Blends comprising a polymer of a vinyl aromatic compound and a polyarylene ether are also useful as the polymer in the blended polymer compositions of the present invention. Among the preferred polyarylene ethers are polyphenylene ethers which may be represented by the following formula

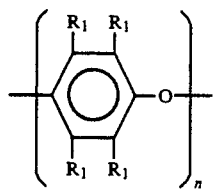

wherein the oxygen ether atom of one unit is connected to the phenyl nucleus of the next adjoining unit; each $R_1$ is independently a monovalent substituent selected from the group consisting of hydrogen, halogen, hydrocarbon groups free of a tertiary alpha-carbon atom, halohydrocarbon groups having at least 2 carbon atoms between the halogen atom and the phenyl nucleus and also being free of a tertiary alpha-carbon atom, hydrocarbonoxy groups free of aliphatic, tertiary alpha-carbon atoms and halohydrocarbonoxy groups containing at least 2 carbon atoms between the halogen atom and the phenyl nucleus and being free of an aliphatic, tertiary alpha-carbon atom; n is an integer of at least about 50 such as from about 50 to about 800 and preferably from about 100 to about 300. Such polyarylene ethers may have molecular weights in the range of between 1000 and 100,000 and more preferably between about 6000 and 100,000. A preferred example of a polyarylene ether is poly(2,6-dimethyl-1,4-phenylene)ether. Examples of polyphenylene ethers useful in the blended polymer compositions of the present invention and methods for their preparation are described in, for example, U.S. Pat. Nos. 3,306,874; 3,306,875; 3,257,357; and 3,257,358, and these patents are incorporated by reference for their disclosures of such polymers.

Typical styrene polymers which can be blended or reacted with the polyphenylene ethers include, for example, homopolymers such as polystyrene and polychlorostyrene, modified polystyrenes such as rubber-modified polystyrenes (high impact styrenes) and the styrene-containing copolymers such as the styrene-acrylonitrile copolymers (SAN), styrene-butadiene copolymers, styrene-acrylonitrile-alpha-alkylstyrene copolymers, styrene-acrylonitrile-butadiene copolymers (ABS), poly-alpha-methylstyrene, copolymers of ethyl vinyl benzene and divinyl benzene, etc.

Blends of styrene resins with these polyarylene ethers such as polyphenylene ethers are available commercially. For example, blends comprising polystyrene and polyphenylene ether typically containing from about 25 to about 50% by weight of polystyrene units are commercially available from the General Electric Company under the tradename NORYL TM thermoplastic resin. The molecular weight of such blends may range from about 10,000 to about 50,000 and more often will be about 30,000.

(vii) Polyetheramide Block Copolymers

The polymer compositions of the present invention may include (vii) a polyetheramide block copolymer. They are produced by polycondensation reaction of a polyether diol (PE) and of a dicarboxyic polyamide (PA). The combination of flexible polyether block with a rigid polyamide block yields a block copolymer with the generic formula:

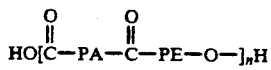

wherein n is a positive integer, PA is a dicarboxylic polyamide and PE is a polyether. ATOCHEM offers a number of such block copolymers under the general trade designation PEBAX®. Specific grades include Pebax® 6312. Pebax® 3533 having various hardness values.

CROSS-LINKING AGENT

In the present invention, a cross-linking agent may optionally be included, provided that when the polymer composition includes a propylene ethylene copolymer, then the cross-linking agent is required. The cross-linking agent is used in an effective amount to provide cross-linking. In one embodiment, the cross-linking agent is present in an amount greater than about 0.020%, or about greater than 0.025%, or about 0.030% by weight of the polymer composition. The cross-linking agent may be used in an amount up to about 5%.

In one embodiment, the cross-linking agent is an organic peroxide. The organic peroxide is generally present in an amount greater than about 0.005%, or about 0.01% by weight of the polymer composition. In one embodiment, the organic peroxide is present in an amount from about 0.020%, or about 0.025%, or about 0.030% to about 5%, or about 2%, or about 1% by weight of the polymer composition. Examples of organic peroxides include: organic peroxy compounds such as dialkyl peroxides (e.g., diethyl peroxide); alkyl hydrogen peroxides (e.g., tert-butyl hydrogen peroxide; diacyl peroxides; and mixed diacyl peroxides. A particularly useful organic peroxide is bis(t-butylperoxy(2,5 dimethyl)) hexane. This dialkyl peroxide is available as a 5 weight percent concentrate from Polyvel Corporation under the tradename CR-05. Other free radical generators include ultraviolet rays, gamma rays, electron beams, etc.

The cross-linking agent may also be a maleimide. The maleimide contain greater than 2, preferably from 2, or 3, up to about 8, or about 6 maleimide groups. In one embodiment, the maleimide is oligomeric. Examples of useful maleimides include bismaleimide and tetramaleimide cross-linking agents.

It is within the scope of the invention to optionally include in the polymer composition, one or more antioxidants. In general, the blended polymer compositions of the present invention will optionally contain from 0.05% to about 0.3% by weight of an antioxidant and most often about 0.2%.

Antioxidants for polymer compositions are well known. For example, hindered phenolic antioxidants are particularly effective in preventing deterioration of physical properties during the preparation of polymer compositions and in extending the useful life of the end product. The hindered phenols suitable in the context of the present invention conform structurally to:

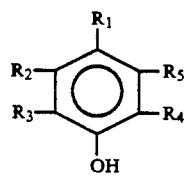

wherein $R_1$, $R_2$ and $R_3$ independently are a hydrogen atom or an alkyl group, $R_3$ and $R_4$ independently are alkyl groups containing at least 4 carbon atoms, preferably a $C_3$-$C_{10}$ alkyl group and more preferably a tertiary butyl group. Specific examples of such hindered phenols include butylated hydroxy toluene (BHT) and butylated hydroxy ethyl benzene (BHEB).

Other conventional polyolefin blend components such as colorants, antistatic agents, lubricants and inert fillers, can be added to the polymer composition of the present invention as is known to those skilled in the art.

The polymer composition of the present invention including ethylene vinyl acetate copolymer and a cross-linking agent and/or (i) a propylene ethylene copolymer, (ii) at least one selectively hydrogenated block copolymer of a vinyl aromatic hydrocarbon in a conjugated diene, (iii) at least one selectively hydrogenated block copolymer of a vinyl aromatic hydrocarbon in a conjugated diene to which has been grafted an alpha, beta-olefinically unsaturated monocarboxylic or dicarboxylic acid reagent; (iv) at least one terpolymer of an alpha-olefin, at least one acrylic ester, and an alpha, beta-olefinically unsaturated dicarboxylic reagent, or glycidyl acrylate; (v) at least one copolymer of an alpha-olefin and an acrylic ester; (vi) at least one vinyl aromatic hydrocarbon; and (vii) at least one polyetheramide block copolymer may be prepared by techniques well known to those skilled in the art. For example, a particularly useful procedure is to intimately mix the polymers using conventional mixing equipment such as a mill, a Banbury mixer, a Brabender Torque Rheometer, a single or twin screw extruder, continuous mixers, kneaders, etc. For example, the polymers may be intimately mixed in the form of granules and/or powder in a high shear mixer. One process for preparing the blended polymers utilizes the Farrel Continuous Mixer (FCM CP-23). Short residence times and high shear are readily obtained in a CP-23. "Intimate" mixing means that the mixture is prepared with sufficient mechanical shear and thermal energy to produce a dispersed phase which is finely divided and homogeneously dispersed in the continuous or principal phase.

Various features and aspects of the present invention are illustrated further in the examples that follow. While these examples are presented to show one skilled in the art how to operate within the scope of this invention, the examples are not to serve as a limitation on the scope of the invention since such scope is only defined in the claims.

Unless otherwise indicated in the following examples and elsewhere in the specification and claims, all parts and percentages are by weight, temperatures are in degrees Centigrade, and pressures are at or near atmospheric.

In the following examples, the polymer compositions are pre-compounded in a 1.5" single screw extruder from Killion (L/D=24:1). The temperature profile is set between 120° C. to about 230° C. The screws speed is set at 100 RPM. Material is gravity fed and a 4-strand die is used. The strands are cooled downstream in a cool water bath (10 feet long) followed by dry the strands via an air knife and then pelletizing. The pellets have diameters of approximately 2 to 3 millimeters.

The tubing of the present invention is generally prepared in a 2.5" single screw extruder (L/D=24:1) from NRM. The pre-compounded pellets are gravity fed into the extruder and the temperature profile is set between 135° C. to 235° C. The extruder is set to 50-75 amps. Screw speed is set by takeoff speeds of tredwheel which collects the tubing. The tubing is quickly cooled by passing is through a downstream water bath (25 to 30 feet long, cold water circulated constantly). Pin and die configurations are used to make tubing having the reported wall thickness and outer diameters.

In the following examples, kink resistance is measured in the Tubing Kink test. The Tubing Kink test involves using a 36" length of tubing which is formed into a loose loop placing the two cut ends together. The loop is pulled slowly between 2 pins placed at 2 times the tubing outer diameter on a flat surface until kinking of the tubing occurs. The distance between the centerline of the pins and the tip of the kink is measured and reported. Smaller distances are preferred.

TABLE

|  | A | B | C | D | E | F |
|---|---|---|---|---|---|---|
| Elvax 3165 | 99.50 | 99.25 | 99.25 | 99.50 | 64.5 | 64.5 |
| Soltex 4208 | — | — | — | — | 35.0 | 35.0 |
| CR-05 | 0.50 | 0.75 | 0.75 | — | 0.5 | — |
| m-phenylene Bismaleimide | — | — | — | 0.50 | — | 0.5 |
| Tubing Dimensions | | | | | | |
| Wall thickness (inch) | 0.025 | 0.052 | 0.030 | 0.025 | 0.025 | 0.025 |
| Outer Diameter (inch) | 0.122 | 0.150 | 0.100 | 0.122 | 0.122 | 0.122 |
| Kink resistance (inch) | 1.00 | 0.52 | 0.36 | 1.29 | 1.50 | 1.29 |

|  | G | H | I | J |
|---|---|---|---|---|
| Elvax 3165 | 75.0 | 74.5 | 99 | 98.5 |
| Lotader TM LX3200 | 25.0 | 25.0 | — | — |
| Kraton TM G1652 | — | — | 1 | 1 |
| CR-05 | — | 0.5 | — | 0.5 |
| Tubing Dimensions | | | | |
| Wall Thickness (inch) | 0.027 | 0.029 | 0.028 | 0.045 |
| Outer Diameter (inch) | 0.112 | 0.096 | 0.090 | 0.199 |
| Kink Resistance | 1.44 | 1.50 | 0.875 | 1.063 |

|  | K | L | M | N | O |
|---|---|---|---|---|---|
| Elvax 3165 | 99 | 98.5 | — | — | 58.4 |
| USI 631 | — | — | 75.0 | 74.5 | — |
| Kraton TM FG 1901X | 1 | 1 | — | — | — |
| SP 2207 | — | — | 25.0 | 25.0 | — |
| Fina Y-8573 | — | — | — | — | 31.5 |
| Kraton TM RP6501 | — | — | — | — | 10 |
| CR-05 | — | 0.5 | — | 0.5 | — |
| B-225 | — | — | — | — | 0.1 |
| Tubing Dimensions | | | | | |
| Wall Thickness (inch) | 0.024 | 0.022 | 0.024 | 0.019 | 0.026 |
| Outer Diameter (inch) | 0.104 | 0.110 | 0.108 | 0.114 | 0.118 |
| Kink Resistance (inch) | 1.50 | 1.00 | 1.31 | 1.44 | 1.66 |

|  | P | Q | R | S | T | U |
|---|---|---|---|---|---|---|
| Elvax 3165 | 90 | 89.5 | 90 | 89.5 | 90 | 89.5 |
| USI 631 | — | — | — | — | — | — |
| Kraton TM FG 1901X | — | — | — | — | — | — |
| Lotader TM Y3200 | — | — | — | — | — | — |
| Fina Y-8573 | — | — | — | — | — | — |
| Kraton TM RP6501 | — | — | — | — | — | — |
| CR-05 | — | 0.5 | — | 0.5 | — | 0.5 |
| B-225 | — | — | — | — | — | — |
| Dylark 350 | 10 | 10 | — | — | — | — |
| Pebax ® 3533 | — | — | 10 | 10 | — | — |
| Zylar 90 | — | — | — | — | 10 | 10 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A tube prepared by the process comprising the steps of:
   (1) blending polymer composition comprising a mixture of (a) a major amount of an ethylene vinyl acetate copolymer, (b) a minor amount of one or more polymers selected from:
      (i) at least one selectively hydrogenated block copolymer of styrene and isoprene or butadiene;
      (ii) at least one selectively hydrogenated block copolymer of styrene and isoprene or butadiene to which has been grafted with an alpha,beta-olefinically unsaturated monocarboxylic or dicarboxylic acid reagent;
      (iii) at least one terpolymer of an alpha-olefin, at least one acrylic ester, and an alpha,beta-olefinically unsaturated dicarboxylic acid reagent, or a glycidyl acrylate;
      (iv) at least one vinyl aromatic hydrocarbon; or
      (v) at least one polyetheramide block copolymer, and optionally, (c) a cross-linking agent selected from the group consisting of an organic peroxide and a maleimide; and
   (2) extruding the polymer composition into the tube.

2. The tube of claim 1 wherein the mixture includes (c) a maleimide cross-linking agent.

3. The tube of claim 1 wherein the block copolymers of (i) and (ii) prior to hydrogenation, are each independently styrene-butadiene-styrene block copolymers.

4. The tube of claim 1 wherein the hydrogenated block copolymers of (i) and (ii) are each independently selectively hydrogenated block copolymers of the formula

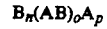

$$B_n(AB)_o A_p$$

wherein
   n = 0 or 1;
   o = 1 to 100;
   p = 0 or 1;
   each B prior to hydrogenation is predominantly a polymerized isoprene or butadiene hydrocarbon block having a number average molecular weight of about 20,000 to about 450,000;

each A is predominantly a polymerized styrene block having a number average molecular weight of about 2000 to about 115,000; the blocks of A constituting about 5% to about 95% by weight of the copolymer; and the unsaturation of the block B is less than about 10% of the original unsaturation.

5. The tube of claim 4 wherein the unsaturation of block B is reduced to less than 5% of its original value and the average unsaturation of the hydrogenated block copolymer is reduced to less than 20% of its original value.

6. The tube of claim 4 wherein A is a polymerized styrene block having a number average molecular weight of between about 4000 and about 60,000.

7. The tube of claim 4 wherein B is a polymerized butadiene block having a number average molecular weight of between about 35,000 and about 150,000, and 35% to 50% of the condensed butadiene units have a 1,2-configuration.

8. The tube of claim 1 wherein the hydrogenated block copolymer of (ii) has been grafted with from about 0.2% to about 20% by weight of the carboxylic acid reagent.

9. The tube of claim 1 wherein the carboxylic acid reagent in (ii) is a dicarboxylic acid, anhydride, imide, half ester, metal salt, or mixtures thereof.

10. The tube of claim 1 wherein the carboxylic acid reagent in (ii) is maleic acid.

11. The tube of claim 1 wherein the terpolymer (iii) comprises from about 60% to about 94% by weight of the olefin, from about 5% to about 40% by weight of the acrylic ester and from about 1% to about 10% by weight of the dicarboxylic acid reagent or the glycidyl acrylate.

12. The tube of claim 1 wherein the alpha-olefin of (iii) contains from 2 to about 6 carbon atoms.

13. The tube of claim 1 wherein the alpha-olefin of (iii) is ethylene, propylene or a mixture thereof.

14. The tube of claim 1 wherein the acrylic ester of (iii) is characterized by the formula $$CH_2=C(R)COOR'$$

wherein R is hydrogen, or a methyl or ethyl group, and R' is an alkyl group containing 1 to about 6 carbon atoms.

15. The tube of claim 1 wherein the dicarboxylic acid reagent of (iii) is maleic anhydride.

16. The tube of claim 1 wherein the polymer (iv) is a homopolymer of a styrene or a copolymer or terpolymer with one or more copolymerizable monomers selected from the group consisting of unsaturated mono- and dicarboxylic acid reagents, acrylonitriles and aliphatic dienes.

17. The tube of claim 1 wherein the polymer (iv) is a copolymer of a vinyl aromatic hydrocarbon and an unsaturated dicarboxylic acid reagent.

18. The tube of claim 4 wherein the dicarboxylic acid reagent in (iv) is an anhydride, imide, metal salt, or partial ester of said dicarboxylic acid, or mixtures thereof.

19. The tube of claim 1 wherein the polymer (iv) is a copolymer of a styrene and a maleic anhydride or an N-hydrocarbyl-substituted maleimide.

20. The tube of claim 1 wherein the tube has a wall thickness from about 0.015 to about 0.05 inches and an outer diamter of 0.075 to 0.175 inches.

21. The tube of claim 1 wherein the extruding in step (2) occurs at a temperature from about 125 to about 250 degrees C.

22. The tube of claim 1 wherein the tube is halogen free.

23. the tube of claim 1 wherein the tube is a monolayer tube.

24. A tube prepared by the processing comprising the steps of:
(1) preparing a polymer composition comprising a mixture of (a) at least about 55% by weight of an ethylene vinyl acetate copolymer, and (b) one or more polymers selected from:
(i) from about 0.5% to about 45% by weight of at least one selectively hydrogenated block copolymer of styrene and isoprene or butadiene;
(ii) from about 0.5% to about 45% by weight of at least one selectively hydrogenated block copolymer of styrene and isoprene or butadiene to which has been grafted an alpha,beta-olefinically unsaturated monocarboxylic or dicarboxylic acid reagent;
(iii) from about 0.5% to about 45% by weight of at least one terpolymer of ethylene or propylene, an acrylic ester and maleic acid, maleic anhydride, or a glycidyl acrylate and
(iv) from about 0.5% to about 45% by weight of a copolymer of a vinyl aromatic hydrocarbon and an unsaturated dicarboxylic acid or derivative thereof; or
(v) from about 0.5% to about 45% by weight of at least one polyether amide copolymer; and optionally,
(c) greater than 0.020% by weight of a cross-linking agent selected from the group consisting of an organic peroxide and a maleimide; and
(2) extruding the polymer composition into the tube.

25. The tube of claim 24 wherein the block copolymer of (i) and (ii) prior to hydrogenation, are each independently styrene-butadiene-styrene block copolymers.

26. The tube of claim 24 wherein the hydrogenated block copolymer of (ii) has been grafted with from about 0.2% to about 20% by weight of the carboxylic acid reagent.

27. The tube of claim 24 wherein the carboxylic acid reagent in (ii) is a dicarboxylic acid, anhydride, imide, half ester or metal salt, or mixtures thereof.

28. The tube of claim 27 wherein the dicarboxylic acid is maleic acid.

29. The tube of claim 24 wherein the terpolymer (iii) comprises from about 60% to about 94% by weight of ethylene, propylene or a mixture thereof, from about 5% to about 40% by weight of the acrylic ester and from about 1% to about 5% by weight of maleic acid or maleic anhydride.

30. The tube of claim 24 wherein the copolymer (vi) is a copolymer of a styrene and a maleic anhydride or an N-hydrocarbyl-substituted maleimide.

* * * * *